(12) United States Patent
McNitt et al.

(10) Patent No.: US 6,424,200 B1
(45) Date of Patent: Jul. 23, 2002

(54) TERMINATION IMPEDANCE TRIMMING CIRCUIT

(75) Inventors: John McNitt, Fort Collins, CO (US); Brett Hardy, Eden Prairie, MN (US)

(73) Assignee: LSI Logic Corporation, Milpitas, CA (US)

( * ) Notice: Subject to any disclaimer, the term of this patent is extended or adjusted under 35 U.S.C. 154(b) by 23 days.

(21) Appl. No.: 09/591,972

(22) Filed: Jun. 12, 2000

(51) Int. Cl.[7] ................................................. H03L 5/00
(52) U.S. Cl. ......................... 327/308; 327/306; 326/30; 326/86
(58) Field of Search ............................... 322/108, 437, 322/427, 308, 333, 331, 319, 306; 326/30

(56) References Cited

U.S. PATENT DOCUMENTS

| | | | | |
|---|---|---|---|---|
| 4,370,526 A | * | 1/1983 | Shoofs et al. | 179/51 AA |
| 5,523,703 A | * | 6/1996 | Yamamoto et al. | 326/30 |
| 6,026,456 A | * | 2/2000 | Iikbarhar | 326/30 |
| 6,157,206 A | * | 12/2000 | Taylor et al. | 326/30 |

* cited by examiner

*Primary Examiner*—Dinh T. Le
(74) *Attorney, Agent, or Firm*—Suiter & Associates

(57) ABSTRACT

A termination impedance in a semiconductor circuit is trimmed to fall within a desired range by a trimming circuit such that the amount of variation in the termination impedance is less than the variation in the sheet rho (resistivity) of the semiconductor. An external reference resistor causes a reference current to flow in multiple branches of a current mirror circuit. One branch of the current mirror circuit has a resistance less than the reference resistor, another has a resistance approximately equal to the reference resistor, and another has resistance greater than the reference resistor. Variation in the sheet rho results voltage drops across the resistor in variation in the resistor values. A logic circuit detects the variations, and encodes a control signal. The control signal is received by a variable termination circuit that switches parallel resistance branches in or out of the termination impedance circuit such that an effective termination impedance is selected based upon the control signal. The resulting termination impedance is thereby maintained within a higher tolerance range than the variation in the termination impedance that would otherwise result from sheet rho variation. 37 CFR 1.72(*b*).

16 Claims, 3 Drawing Sheets

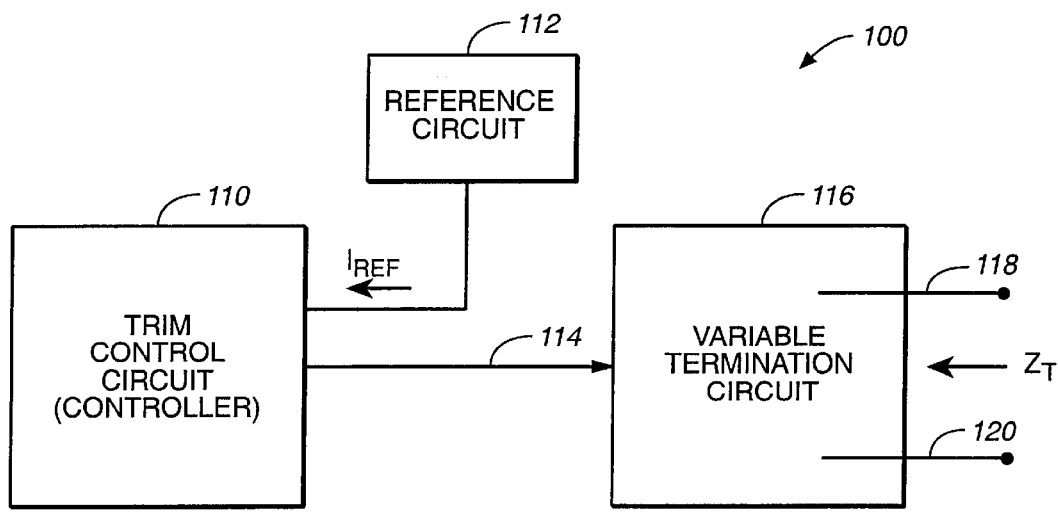
FIG._1
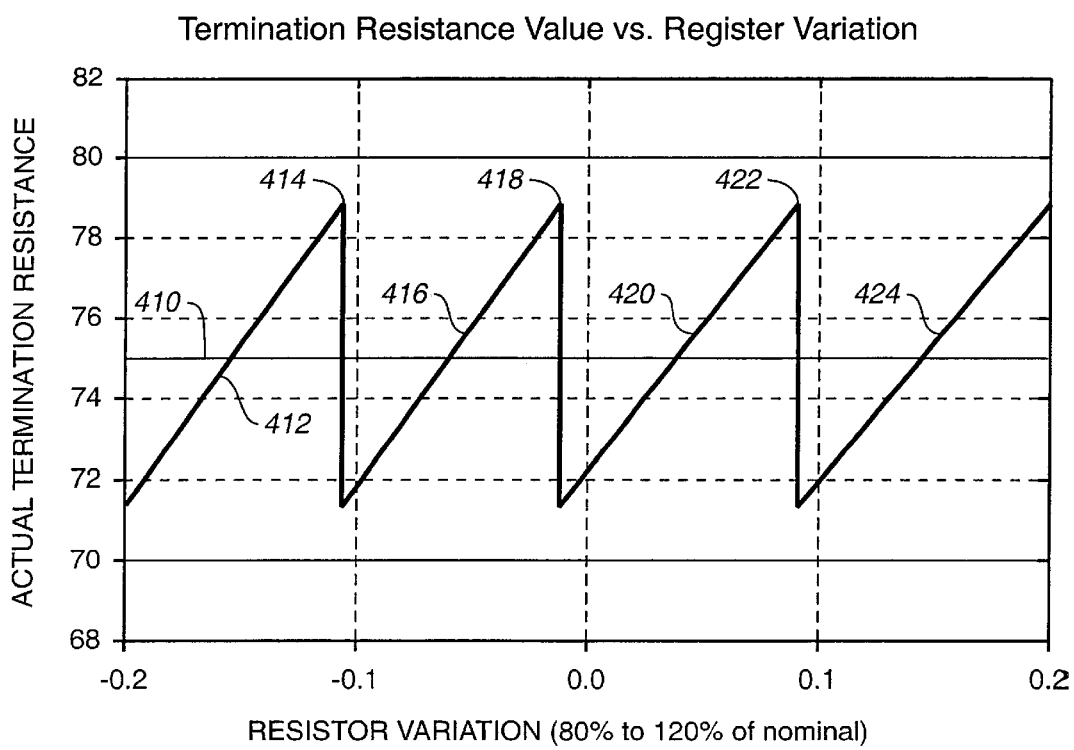
FIG._4

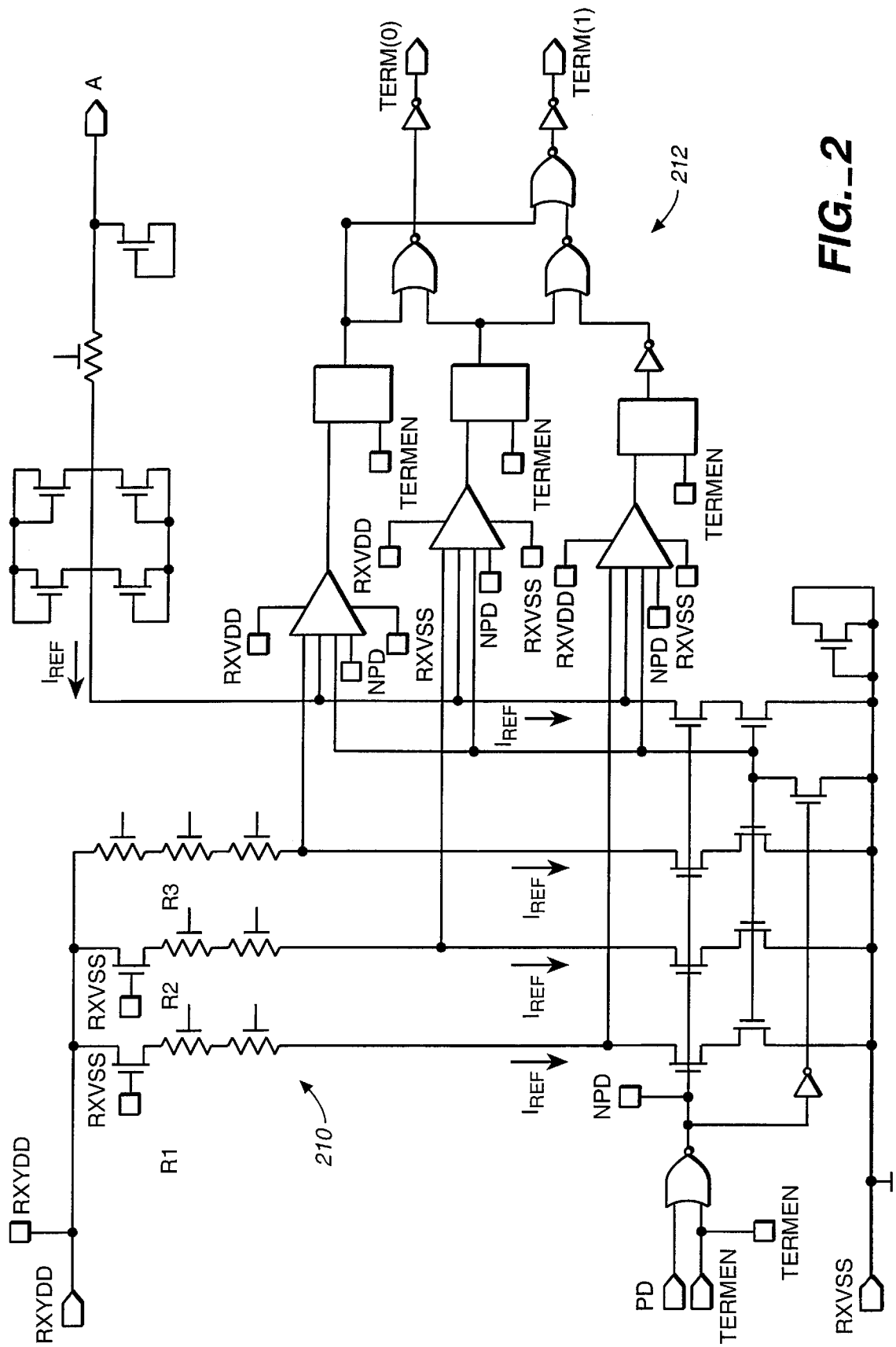
FIG._2

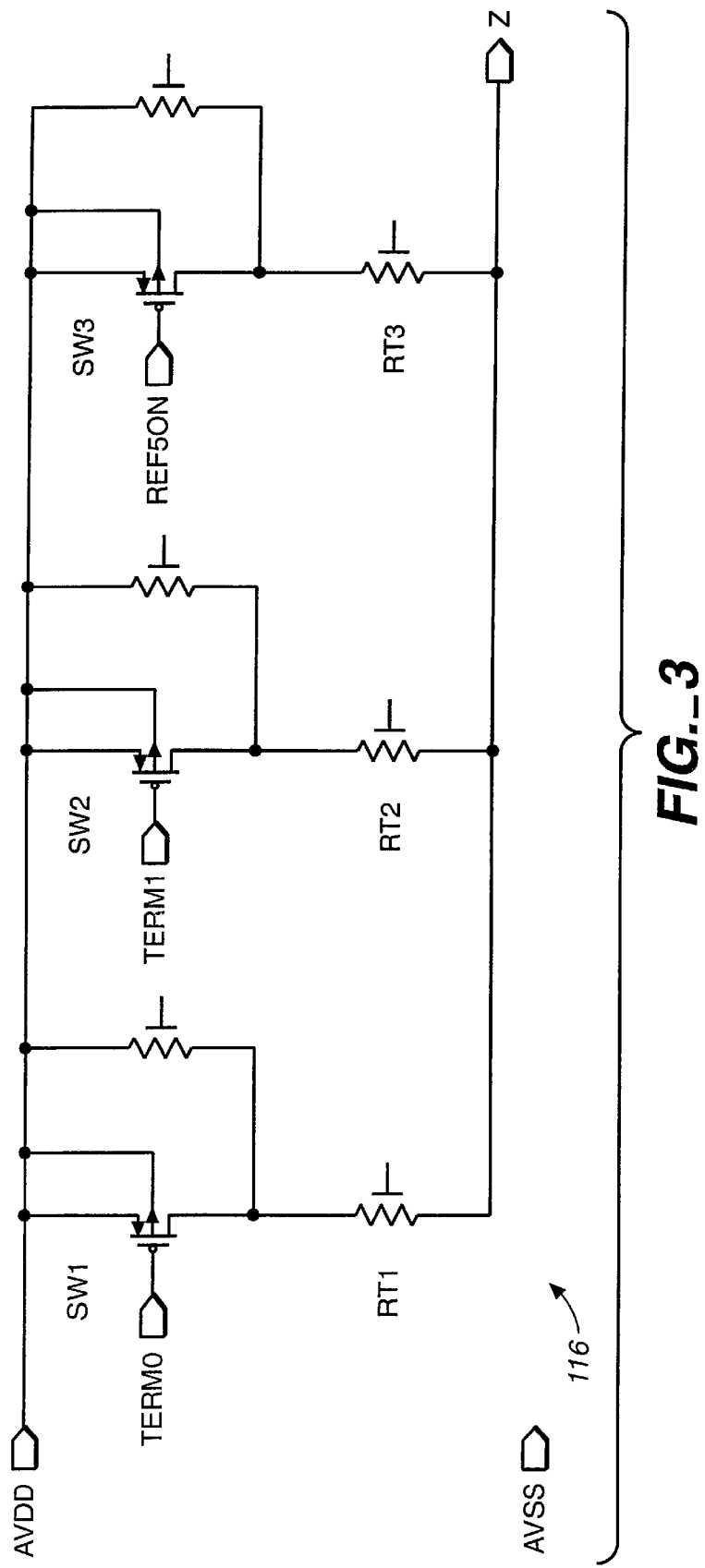
FIG._3

TERMINATION IMPEDANCE TRIMMING CIRCUIT

BACKGROUND

The present invention relates generally to semiconductor circuits, and more particularly to compensating for component value variation in semiconductor circuits.

Semiconductor processes typically result in components having actual values that differ from the nominal design value within a statistical range. For example, a resistor designed to have a nominal resistance of 75 ohms may end up having an actual resistance ranging from 60 ohms to 90 ohms, a ±20% variation due to variation in the resistivity (sheet rho) of the semiconductor material on which the resistor is fabricated. When the element value is critical to the operation of the circuit, such variation may adversely affect the performance of the circuit. For example, in higher speed circuits that require a close match between the termination impedance of the circuit and the impedance of the transmission line to which the circuit is coupled for optimum performance, too much variation in the termination impedance due to the manufacturing process may result in unacceptable performance such that some semiconductor wafers are unusable. Thus, there lies a need to be able to provide a better tolerance component value in a semiconductor chip even where the process variation is higher such that normally unusable semiconductor wafers are usable.

SUMMARY

The present invention is directed to a termination impedance trimming circuit for controlling the variation in the termination output impedance of a circuit that results from sheet rho resistivity variation in an integrated circuit. As a result of the termination impedance trimming circuit, the actual termination output impedance is maintained within a tighter tolerance range than would otherwise be achieved with a fixed, non-trimmed termination impedance that would otherwise have a larger, unacceptable tolerance range. In one embodiment of the present invention, a reference circuit provides a reference current through an array of sensing resistors having different selected values. The reference current through the resistors controls the trip points of respective comparators coupled to the resistors to provide a control signal to a variable termination circuit. In response to the control signal, the variable termination circuit switches resistance branches in or out of the termination output impedance circuit to provide a selected termination impedance. The voltage drops across the sensing resistors will vary according to the sheet rho (resistivity) variation of the semiconductor so that the termination impedance is selected according to the sheet rho variation. The termination impedance is thereby maintained within a desirable range that is less than the variation in the semiconductor resistivity.

BRIEF DESCRIPTION OF THE DRAWINGS

The numerous advantages of the present invention may be better understood by those skilled in the art by reference to the accompanying figures in which:

FIG. 1 is a block diagram of a termination impedance trimming circuit in accordance with the present invention;

FIG. 2 is a circuit diagram of an example circuit for the trim controller circuit shown in FIG. 1 in accordance with the present invention;

FIG. 3 is a circuit diagram of an example circuit for the variable termination circuit shown in FIG. 1 in accordance with the present invention; and FIG. 4 is a plot of the variation in actual termination impedance with variation in the resistivity (sheet rho) of the semiconductor fabrication process in accordance with the present invention.

DETAILED DESCRIPTION

Reference will now be made in detail to the presently preferred embodiment of the invention, an example of which is illustrated in the accompanying drawings.

Referring now to FIG. 1, a block diagram of a termination impedance trimming circuit in accordance with the present invention. Trimming circuit 100 consists of two sub blocks, a variable termination circuit block 116 and a trim control circuit block 110. A reference circuit 112 is coupleable to control circuit 10 to provide a reference current ($I_{REF}$) to control circuit 110 in accordance with the present invention. Control circuit 110 provides a control output signal 114 to variable termination circuit 116 in response to the reference current received from reference circuit 112. In response to control output signal 114, variable termination circuit provides a desired termination impedance ($Z_T$) appearing at output terminals 118 and 120.

Referring now to FIG. 2, an embodiment of the trim control circuit of FIG. 1 will be discussed. Control circuit 110 is designed to detect the sheet rho (resistivity) variation in the integrated circuit in which impedance trimming control circuit 100 is utilized. As an example, the nominal design value of the termination impedance is selected as 75 ohms. The sheet rho variation of the semiconductor fabrication process may vary by ±20 percent such that the actual termination impedance would vary from 60 to 90 ohms, an unacceptable range. It is desirable to reduce the range of acceptable termination impedance values to fall within the range of 70 to 80 ohms, a variance of ±6.67 percent. To detect the sheet rho variation, control circuit 110 couples to an external reference to provide an accurate reference value to an array 210 of multiple resistors, R1, R2, and R3 in the embodiment shown. The external reference circuit 112 develops a reference current $I_{REF}$ that is mirrored through array 210. In one embodiment of the invention, reference circuit 112 comprises an external, higher precision, discrete 3 kilohm resistor whose value is independent of the sheet rho variation since it is not a part of the integrated circuit on which trimming circuit 100 is fabricated. Reference circuit 112 couples to control circuit 110 at node A shown in FIG. 2, thereby creating reference current $I_{REF}$ to flow into transistors MN3A and MN3B. Each of the resistors R1, R2, and R3 are coupled to corresponding transistors MN6A and MN6B, MN5A and MN5B, and MN4A and MN4B, respectively, that form current mirror circuits with transistors MN3A and MN3B so that the reference current $I_{REF}$ is caused to flow through each of the resistors R1, R2, and R3 of array 210. In the example shown in FIG. 2, resistor R1 is designed to have a first value that is 92 percent of the reference resistance of reference circuit 112, R2 is designed to have a second value that is 102 percent of the reference resistance, and R3 is designed to have a third value that is 113 percent of the reference resistance. In the example shown in FIG. 2, R1 comprises an array of eight 300 ohm series connected resistors in series with a 185 ohm resistor in series with transistor MP2 having an on resistance of 174 ohms to provide a total resistance of 2759 ohms. Likewise, R2 comprises an array of nine 300 ohm series connected resistors in series with a 190 ohm resistor in series with transistor MP3 having an on resistance of 142 ohms to provide a total resistance of 3032 ohms. R3 comprises an array of nine 300 ohm series connected resistors in series with a 390 ohm resistor in series with a 300 ohm resistor to provide a total resistance of 3390 ohms. In general, R1 has a value that is less than the reference resistance, R2 has a value that is approximately equal to the reference resistance, and R3 has a value that is greater than the reference resistance. Since the resistors R1, R2, and R3 of array 210 each have a different resistance but have the same current value flowing through them, a different voltage drop will appear across each of the resistors of array 210. Each resistor of array 210 is coupled to a respective comparator, where resistor R1 is coupled to comparator I3, R2 is coupled to comparator I2, and resistor R3 is coupled to comparator I1. The voltage drops across each of the resistors of array 210 are compared with the voltage drop across the external reference resistor. Since the actual values of the resistors of array 210 may vary as much as +/−20 percent according to the sheet rho variance, the different percentages of variation of the voltage drops across the resistors to cause comparators I1, I2, and I3 to trip in response to the variation in the resistance values due to the sheet rho variation. The outputs of comparators I1, I2, and I3 are provided as a digital output encoded by logic circuit 212 to the outputs of terminals TERM(0) and TERM(1). Logic circuit 212 comprises a combination of latches and gates as shown in FIG. 2 to encode the desired output values. The outputs of terminals TERM(0) and TERM(1) are provided to termination circuit 116 as control output signal 114. In the particular embodiment shown in FIG. 2, resistors R1 and R2 include PMOS transistors MP2 and MP3 such that the on resistances of transistors MP2 and MP3 contribute to the overall resistance and thus to the trip point of each corresponding resistor R1 and R2 in array 210. In such a configuration, the trip points in each resistor leg of array 210 will track the variation in the on resistances of similar type switches included in termination circuit 116 that are utilized to select an optimal termination impedance as discussed with respect to FIG. 3. Resistor leg R3 does not include a PMOS switch since in the embodiment shown, no corresponding transistor in termination circuit 116 is activated by the trip point of R3.

Referring now to FIG. 3, an embodiment of the variable termination circuit of FIG. 1 will be discussed. Termination circuit 116 comprises multiple parallel resistance branches RT1, RT2, and RT3 coupled to respective transistor switches SW1, SW2, and SW3. Switch SW1 receives the control signal from terminal TERM(0) as a control input, and switch SW2 receives the control signal from terminal TERM(1) as a control input. Switch SW3 receives a control signal REF50N that selects between two different termination impedances. For example, the nominal termination impedance $Z_T$ may be either 75 ohms or 50 ohms depending upon the desired application. In this example, if REF50N is low (0) then the termination impedance is selected to be 75 ohms, and when REF50N is high (1) then the termination impedance is selected to be 50 ohms. By selectively turning on or off switches SW1, SW2, and SW3 in various combinations with control signals TERM(0), TERM(1), and REF50N, a desired termination impedance may be selected to be within an acceptable value. By selecting appropriate values for the resistances in the resistance branches RT1, RT2, and RT3, the tolerance of the termination impedance may be maintained within a tighter range than the sheet rho variation. As shown in FIG. 3, each resistance branch RT1, RT2, and RT3, includes a corresponding switch SW1, SW2, and SW3, respectively, which are PMOS transistors in the embodiment shown, so that each resistance branch may be selected by trim control circuit 110. In each branch, a first resistor is coupled in parallel with the corresponding switch, and a second resistor is coupled in series with the switch at the drain terminal. This configuration is provided so that in the condition where the switch is off, a resistor-divider is formed by the two resistors in each leg resulting in a reduced voltage swing at the drain terminal node, thereby reducing the effect of the parasitic capacitance of the switch to prevent the undesirable effect of reduced bandwidth. In the embodiment shown in FIGS. 2 and 3, a control signal 114 having two bits of information is utilized to select between four combinations of resistances for each nominal termination impedance. Other arrangements may be provided using fewer or greater bits in control signal 114 to provide fewer or greater combinations of resistances wherein the resulting tolerance range of the termination impedance is controlled according to the number of bits used in control signal 114; that is a better tolerance may be obtained by using more bits in control signal 114 if desired. An example of the resulting termination impedance based on control inputs TERM(0), TERM(1), and REF50N is shown in Table 1.

TERM(0) TERM(1) REF50N is shown in Table 1.

TABLE I

Selected termination impedance based on control inputs

| TERM(0) | TERM(1) | REF50N | $Z_T$ (Ω) |
|---|---|---|---|
| 1 | 1 | 0 | 89.49 |
| 1 | 0 | 0 | 80 |
| 0 | 1 | 0 | 72.33 |
| 0 | 0 | 0 | 66 |
| 1 | 1 | 1 | 56.05 |
| 1 | 0 | 1 | 52.17 |
| 0 | 1 | 1 | 48.80 |
| 0 | 0 | 1 | 45.83 |

Referring now to FIG. 4, a plot of the termination resistance with variances resistivity in accordance with the present invention will be discussed. The actual resulting termination resistance $Z_T$ when the impedance trimming control circuit 100 is utilized is plotted on the vertical axis. The variation in resistivity of the semiconductor fabrication process is plotted on the horizontal axis. The plot of FIG. 4 shows the termination impedance where the nominal termination impedance is 75 ohms as a selected example where the nominal termination impedance is represented by a horizontal line 410 having constant value of 75 ohms. Where the resistivity sheet rho variation is at a lower value of −0.2 (80 percent of nominal), the termination impedance is around 71 ohms. For increasing resistivity process variation, the termination impedance will increase along curve 412. When the resistivity is described by curve 412, none of comparators I1, I2 or I3 is activated, and terminals TERM(0) and TERM(1) both provide low (0) control signals. As a result, switches SW1 and SW2 are turned off, and resistance branches RT1 and RT2 are switched out of the circuit. In this example where the nominal termination impedance is 75 ohms, control signal REF50N is always low (0) so that switch SW3 is turned off and resistance branch RT3 is also switched out of the circuit. Where the resistivity variation is increased to just below approximately −0.1 and the termination resistance is approximately 79 ohms at trip point 414, the voltage drop across R1 trips comparator I3, causing the TERM(1) output value to be high (1) and turn on switch SW2, thereby introducing resistance branch R2 into the termination impedance circuit between terminals 118 and 120. As a result, the actual termination impedance is dropped down to a lower value near 71 ohms in the present example, and the termination impedance is described by curve 416. When the resistivity variation is at a higher value just under 0 at trip point 418, the voltage drop across R2 trips comparator 12, such that the value at TERM(1) is low (0) and the value at TERM(0) is high (1). This condition turns on switch SW1 introducing resistance branch RT1 into the termination impedance circuit, and turns off switch SW2 removing resistance branch RT2 from the termination impedance circuit. The actual output termination impedance is described by curve 420. Where the resistivity variation is near 0.1 at trip point 422, the voltage drop across resistor R3 trips comparator I1, causing the values at TERM(0) and TERM(1) to both be high (1). This condition turns both switches SW1 and SW2 on introducing both resistance branches RT1 and RT2 into the termination impedance circuit, which is described by curve 424 under these conditions. As a result, the actual effective output termination impedance is maintained between 70 and 80 ohms for all resistivity variations such that a +/−20 percent resistivity variation results in a better than +/−6.67 percent variation in the termination impedance. In the case where the nominal termination impedance is 50 ohms, control signal REF50N is high (1) causing switch SW3 to be turned on introducing resistance branch RT3 into the termination impedance circuit across terminals 118 and 120 for all values of the resistivity (sheet rho) variation. The actual termination impedance curve for 50 ohms will be described by a similar saw tooth wave form as shown in and described with respect to FIG. 4 with according impedance values. One having skill in the art would appreciate that the impedances shown by example herein may be altered, and other types of switches, latches, and combinational logic gates and circuits may be utilized without providing substantial change to the scope of the present invention. For example, other types of transistors such as bias-junction transistors may be utilized in lieu of the MOSFET transistors shown in FIGS. 2 and 3 where appropriate, or circuits that are equivalent to comparators 11, 12, and 13 and to logic circuit 212 may be utilized without providing substantial change to the operation or scope of the invention.

Although the invention has been described with a certain degree of particularity, it should be recognized that elements thereof may be altered by persons skilled in the art without departing from the spirit and scope of the invention. It is believed that the termination impedance trimming circuit of the present invention and many of its attendant advantages will be understood by the forgoing description, and it will be apparent that various changes may be made in the form, construction and arrangement of the components thereof without departing from the scope and spirit of the invention or without sacrificing all of its material advantages, the form herein before described being merely an explanatory embodiment thereof. It is the intention of the following claims to encompass and include such changes.

What is claimed is:

1. An apparatus, comprising:
    a semiconductor chip;
    a variable termination circuit placed on said chip for providing a termination impedance; and
    a trim control circuit for providing a control signal to said variable termination circuit wherein said variable termination circuit provides said termination impedance in response to the control signal, whereby said trim control circuit adjusts for sheet rho resistivity variation on said chip by comparing at least one voltage drop across a reference impedance located on said chip with a voltage drop across an impedance located off said chip by causing a reference current of approximately same value to flow through said impedance located on said chip and said reference impedance located off said chip.

2. An apparatus as claimed in claim 1, said variable termination circuit comprising an array of at least one or more resistance branches and a switch coupled to a corresponding one of each of said at least one or more resistance branches, each switch receiving at least a portion of the control signal such that each at least one or more resistance branches are individually coupled to the termination impedance to provide an effective termination impedance in combination based upon the control signal.

3. An apparatus as claimed in claim 2, said at least one or more resistance branches of said array comprising a first resistor coupled in parallel with said switch and a second resistor coupled in series with said switch.

4. An apparatus as claimed in claim 1, said trim control circuit comprising an array of at least one or more resistors each having a predetermined value such that the control signal is generated based upon a voltage drop across each of said at least one or more resistors caused by a reference current flowing through each of said at least one or more resistors.

5. An apparatus as claimed in claim 4, the control signal being responsive to the voltage drop across each of said at least one or more resistors such that variation in the resistivity of the semiconductor modulates, the control signal to select the selected termination impedance in accordance with the variation in the resistivity of the semiconductor.

6. An apparatus as claimed in claim 4, said array including a series transistor in series with at least one of said at least one or more resistors such that an on resistance variation of said at least one series transistor tracks an on resistance variation of at least one transistor in said variable termination circuit.

7. An apparatus as claimed in claim 1, said first means comprising an array of at least one or more resistors each having a predetermined value such that the control signal is generated based upon a voltage drop across each of said at least one or more resistors caused by a reference current flowing through each of said at least one or more resistors.

8. An apparatus as claimed in claim 7, the control signal being responsive to the voltage drop across each of said at least one or more resistors such that variation in the resistivity of the semiconductor modulates the control signal to select the selected termination impedance in accordance with the variation in the resistivity of the semiconductor.

9. An apparatus as claimed in claim 7, said array including a series transistor in series with at least one of said at least one or more resistors such that an on resistance variation of said at least one series transistor tracks an on resistance variation of at least one transistor in said variable termination circuit.

10. An apparatus, comprising:
    a semiconductor chip;
    first means for providing a termination impedance; and
    second means for providing a control signal to said first means wherein said first means provides said termination impedance in response to the control signal, whereby said second means adjusts for sheet rho resistivity variation on said chip by comparing at least one voltage drop across an impedance located on said chip with a voltage drop across a reference impedance located off said chip by causing a reference current of approximately same value to flow through said impedance located on said chip and said reference impedance located off said chip.

11. An apparatus as claimed in claim 10, said first means comprising an array of at least one or more resistance branches and a switch coupled to a corresponding one of each of said at least one or more resistance branches, each switch receiving at least a portion of the control signal such that each at least one or more resistance branches are individually coupled to the termination impedance to provide an effective termination impedance in combination based upon the control signal.

12. An apparatus as claimed in claim 11, said at least one or more resistance branches of said array comprising a first resistor coupled in parallel with said switch and a second resistor coupled in series with said switch.

13. An apparatus for providing a termination impedance, comprising:

a semiconductor chip;

a current mirror circuit having at least one or more branches for causing a reference current to flow through each of the at least one or more branches;

an impedance element in each of the at least one or more branches through which the reference current is caused to flow during operation of said current mirror;

a logic circuit responsive to a voltage drop across said impedance element in each of the at least one or more branches of said current mirror in comparison to a second voltage drop across a reference impedance located off said chip, said logic circuit providing a control signal in response to a value of said impedance element in each of the at least one or more branches; and an array of at least one or more termination impedances, said array receiving the control signal such that an effective termination impedance is selectable in response to the control signal.

14. An apparatus as claimed in claim 13, said current mirror providing the reference current from a higher precision resistor having a value independent of the value of said impedance element.

15. An apparatus as claimed in claim 13, said impedance element including a resistance having a value that falls within a first variation range and said effective termination impedance having a value that falls within a second variation range such that the second variation range is tighter than the first variation range.

16. An apparatus as claimed in claim 13, the control signal being encoded by said logic circuit as a digital signal.

* * * * *